(12) United States Patent
Yanai et al.

(10) Patent No.: US 8,152,244 B2
(45) Date of Patent: Apr. 10, 2012

(54) BRAKE CONTROL DEVICE

(75) Inventors: Kohei Yanai, Toyota (JP); Eiji Nakamura, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1107 days.

(21) Appl. No.: 11/861,844

(22) Filed: Sep. 26, 2007

(65) Prior Publication Data
US 2008/0084107 A1 Apr. 10, 2008

(30) Foreign Application Priority Data

Oct. 5, 2006 (JP) ................................. 2006-273590

(51) Int. Cl.
*B60T 8/88* (2006.01)
*B60T 8/40* (2006.01)
*B60T 8/62* (2006.01)

(52) U.S. Cl. ................. 303/122.09; 303/116.2; 303/186

(58) Field of Classification Search ............... 303/116.1, 303/116.2, 122.08, 122.09, 122.1, 9.63, 155, 303/186, 188
See application file for complete search history.

(56) References Cited

U.S. PATENT DOCUMENTS

| | | | | |
|---|---|---|---|---|
| 5,951,118 A * | 9/1999 | Soejima | ..................... | 303/113.1 |
| 5,978,725 A * | 11/1999 | Kagawa | .......................... | 701/70 |
| 6,957,870 B2 * | 10/2005 | Kagawa et al. | ............. | 303/113.4 |
| 7,244,002 B2 * | 7/2007 | Tsunehara | ................. | 303/116.2 |
| 2006/0066146 A1 * | 3/2006 | Otomo | .......................... | 303/151 |
| 2007/0090690 A1 * | 4/2007 | Ohkubo | ........................ | 303/122 |
| 2007/0108837 A1 * | 5/2007 | Ohkubo et al. | .......... | 303/122.08 |

FOREIGN PATENT DOCUMENTS

| | | |
|---|---|---|
| EP | 1 795 416 A1 | 6/2007 |
| JP | 11-115739 | * 10/1997 |
| JP | 10-16752 | 1/1998 |
| JP | 10-35466 | 2/1998 |
| JP | 11-59403 | 3/1999 |
| JP | 11-115739 | 4/1999 |
| JP | 11-115740 | * 4/1999 |
| JP | 2001-123889 | 5/2001 |
| JP | 2006-123889 | 5/2006 |

* cited by examiner

*Primary Examiner* — Bradley King
*Assistant Examiner* — Vishal Sahni
(74) *Attorney, Agent, or Firm* — Oblon, Spivak, McClelland, Maier & Neustadt, L.L.P.

(57) ABSTRACT

During a non-control mode, a separation valve is closed, and thus separates a first supply path that supplies working fluid to at least one of wheel cylinders and a second supply path that supplies working fluid to at least one of the other wheel cylinders, from each other. An on-off valve provided on the first supply path is kept closed despite a valve opening command, due to the effect of the differential pressure between the outlet and inlet openings of the valve if the differential pressure is above a predetermined value while the valve is closed. When occurrence of a closure failure on the separation valve is assumed during braking, a brake ECU stops the control performed by a wheel cylinder pressure control system, and shifts to a backup non-control mode, and controls the discharge of working fluid from the first supply path-side wheel cylinders so that the on-off valve is opened in accordance with the valve opening command. Thus, the confinement of the wheel cylinder pressure is prevented.

9 Claims, 3 Drawing Sheets

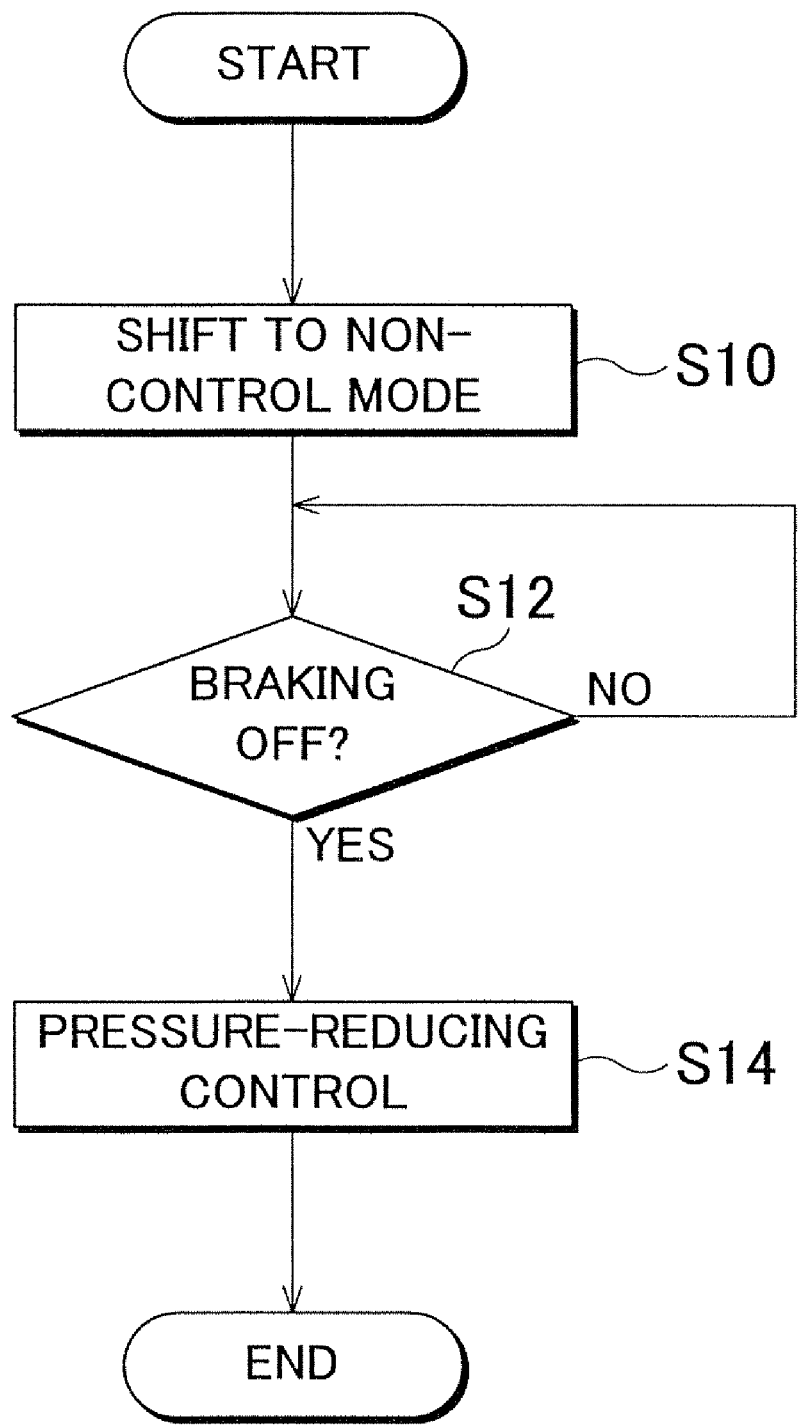

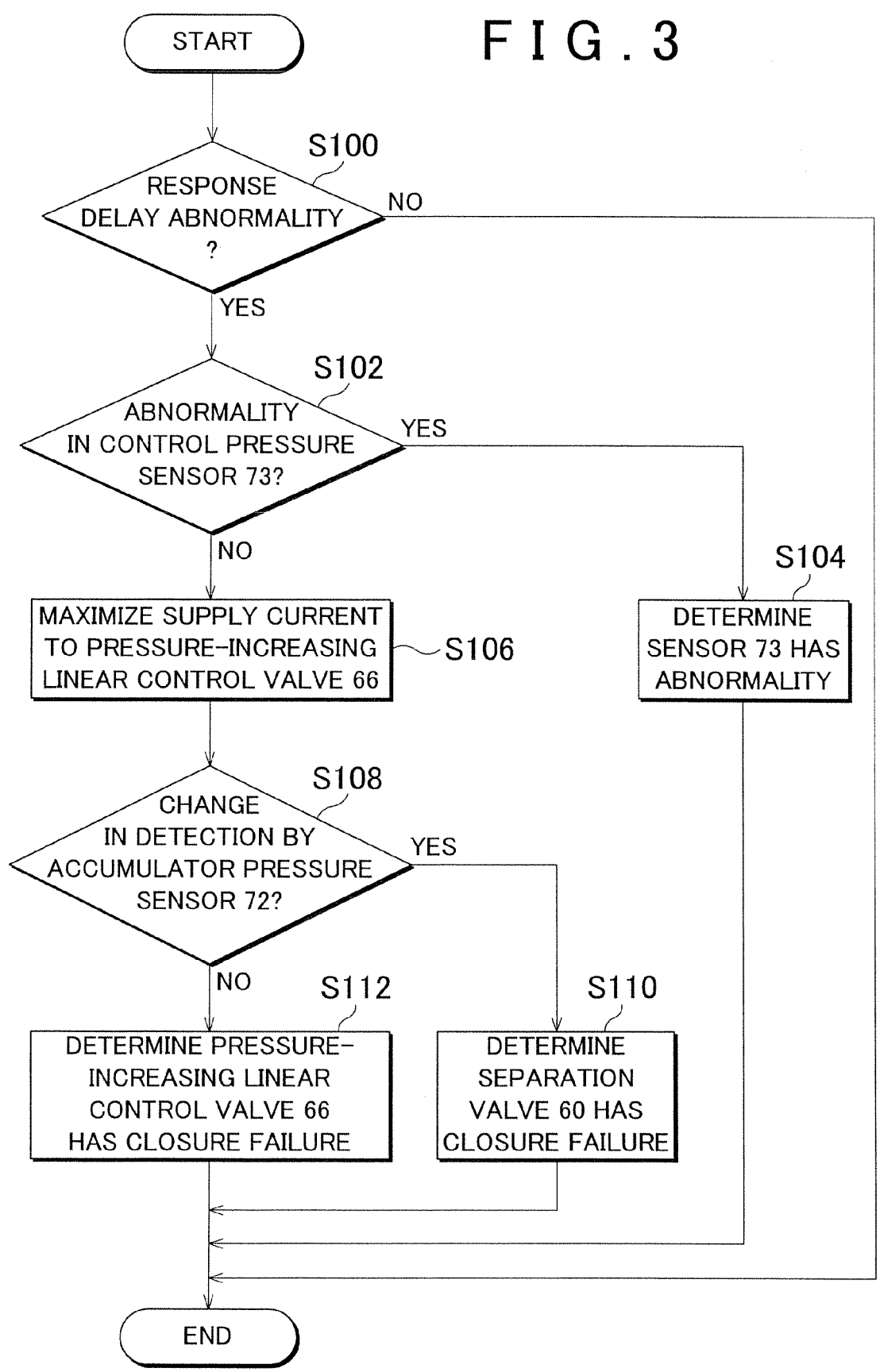

BRAKE CONTROL DEVICE

INCORPORATION BY REFERENCE

The disclosure of Japanese Patent Application No. 2006-273590 filed on Oct. 5, 2006, including the specification, drawings and abstract is incorporated herein by reference in its entirety.

BACKGROUND OF THE INVENTION

1. Field of the Invention

The invention relates to a brake control device that controls the braking force applied to wheels provided in the vehicle.

2. Description of the Related Art

Japanese Patent Application Publication No. JP-A-2006-123889 describes a hydraulic brake device that includes a hydraulic pressure booster, a master cylinder, a power hydraulic pressure source, and a plurality of brake cylinders. According to this hydraulic brake device, the brake cylinders are selectively connected in communication with the hydraulic pressure booster, the master cylinder and the power hydraulic pressure source through the use of a simple circuit, so that the controllability can be improved. When the system is normal, the working liquid is supplied from the power hydraulic pressure source to the brake cylinders. If an abnormality is detected, the control mode is switched to a control mode that is different from the control mode selected during the normal state. At the time of switching the control mode, a plurality of control valves provided within the brake device are altered in the open-closed state.

Furthermore, Japanese Patent Application Publication No. JP-A-10-16752 describes a brake fluid pressure control device. In this device, if an excessive wheel cylinder pressure occurs on a wheel cylinder, the wheel cylinder is connected for conduction to a reservoir tank so as to reduce the wheel cylinder pressure. Then, at the time point when the wheel cylinder pressure is appropriately reduced, the master cylinder and the wheel cylinder are connected for conduction. Therefore, even though the hydraulic pressure source of the wheel cylinders is switched to the master cylinder, the high liquid pressure does not reversely flow from the wheel cylinders of the master cylinder.

Depending on the site of occurrence of an abnormality, there is possibility that fluid pressure may be confined in a wheel cylinder due to the switching of the control mode. If the confinement of wheel cylinder pressure occurs, a corresponding one of the wheels is caused to have a drag.

SUMMARY OF THE INVENTION

Accordingly, it is an object of the invention to provide a brake control technology that makes it possible to prevent the confinement of wheel cylinder pressure at the time of switching the control mode.

According to one aspect of the invention, there is provided a brake control device including: a plurality of wheel cylinders that are supplied with a working fluid and applies a braking force to each of a plurality of wheels; a manual hydraulic pressure source that pressurizes the working fluid held in the manual hydraulic pressure source, in accordance with an amount of operation performed on a brake operating member by a driver; a separation valve that is caused to be in a closed state at a time of a backup brake mode during which the working fluid is supplied from the manual hydraulic pressure source to the plurality of wheel cylinders, so that the separation valve separates a first supply path that supplies the working fluid to at least one of the plurality of wheel cylinders and a second supply path that supplies the working fluid to at least one of the plurality of wheel cylinders other than the at least one of the plurality of wheel cylinders supplied with the working fluid by the first supply path, from each other; a wheel cylinder pressure control system that is connected to the first supply path, and that controls the working fluid pressure of the plurality of wheel cylinders in a manner common to the plurality of wheel cylinders, independently of brake operation of the driver; an on-off valve that is provided on the first supply path, and that is kept in a closed valve state despite a valve opening command, due to an effect of a differential pressure between an outlet opening and an inlet opening of the on-off valve if the differential pressure is above a predetermined pressure while the on-off valve is closed; and a controller that, when occurrence of a closure failure on the separation valve is assumed during braking, stops a control performed by the wheel cylinder pressure control system, and shifts to the backup brake mode, and controls discharge of the working fluid from the wheel cylinders on a first supply path side so as to lessen the differential pressure so that the on-off valve is opened in accordance with the valve opening command.

According to the brake control device as described above, when occurrence of the closure failure on the separation valve is assumed during braking, the brake control device stops the control performed by the wheel cylinder pressure control system, and shifts to a backup brake mode. In this case, due to a required time for the detection of a failure, a control delay, etc., the unintended increased pressure of the wheel cylinders may possibly be continued by the wheel cylinder pressure control system via the first supply path during a period until the mode shift is completed. However, in the foregoing brake control device, the discharge of working fluid from the first supply path-side wheel cylinders is appropriately controlled so that the differential pressure acting on the on-off valve is lessened. Hence, it is possible to avoid an event where, due to the unintended increased pressure, the differential pressure between the outlet and inlet openings of the on-off valve on the first supply path exceeds a predetermined pressure (hereinafter, the predetermined pressure will be referred to as "self-closure-release pressure", as appropriate) so that the closed valve state of the on-off valve is maintained despite the valve opening command, due to the effect of the differential pressure. Therefore, even if the closure failure occurs on the separation valve during braking, the confinement of the wheel cylinder pressure is prevented, and the drag of wheels that can result from the pressure confinement is also prevented.

BRIEF DESCRIPTION OF THE DRAWINGS

The features, advantages thereof, and technical and industrial significance of this invention will be better understood by reading the following detailed description of preferred embodiments of the invention, when considered in connection with the accompanying drawings, in which:

FIG. 2 is a flowchart for describing an example of a pressure-reducing process regarding the wheel cylinder pressure in accordance with an embodiment of the invention; and FIG. 3 is a flowchart for describing an example of a process of identifying a closure failure of a separation valve in accordance with a modification of the embodiment.

DETAILED DESCRIPTION OF THE PREFERRED EMBODIMENTS

Figure 1:
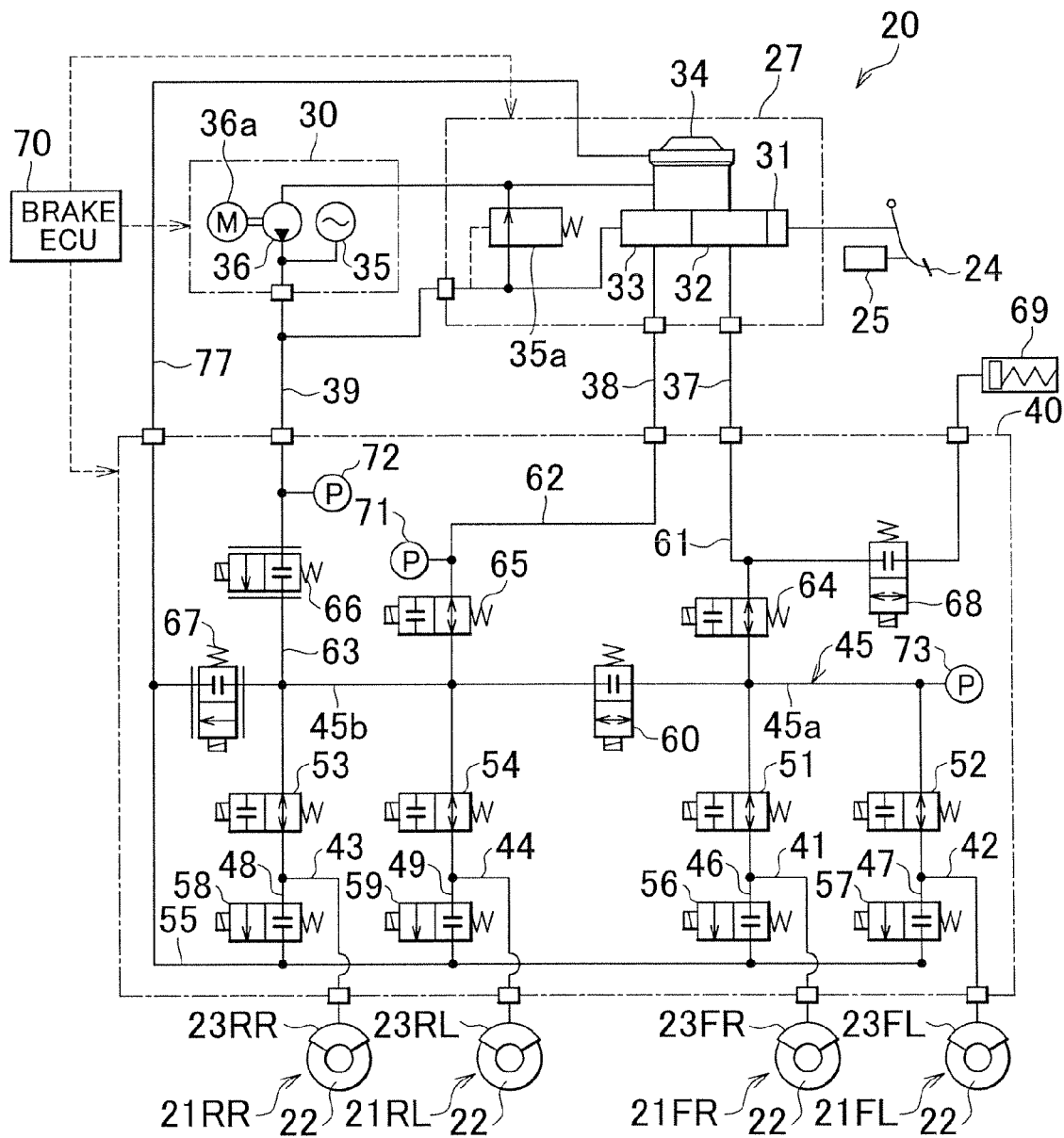
FIG. 1 is a system diagram showing a brake control device in accordance with an embodiment of the invention.

In the following description and the accompanying drawings, the present invention will be described in more detail with reference to exemplary embodiments.

FIG. 1 is a system diagram showing a brake control device 20 in accordance with an embodiment of the invention. The brake control device 20 shown in FIG. 1 forms an electronic control brake system (ECB) for a vehicle, and controls braking forces applied to four wheels provided in the vehicle. The brake control device 20 in accordance with the embodiment is mounted, for example, a hybrid vehicle that is equipped with an electric motor and an internal combustion engine as power sources for driving the vehicle. In such a hybrid vehicle, each of the regenerative braking of braking the vehicle by regenerating kinetic energy of the vehicle into electric energy, and the hydraulic braking by the brake control device 20 can be used for the braking of the vehicle. The vehicle in this embodiment is able to execute a brake regeneration coordinated control of generating a desired braking force through the combined use of the regenerative braking and the hydraulic pressure braking.

The brake control device 20, as shown in FIG. 1, includes disc brake units 21FR, 21FL, 21RR and 21RL provided corresponding to the individual wheels, a master cylinder unit 27, a power hydraulic pressure source 30, and a hydraulic actuator 40.

The disc brake units 21FR, 21FL, 21RR and 21RL applies braking force to a right front wheel, a left front wheel, a right rear wheel and a left rear wheel of the vehicle, respectively. The master cylinder unit 27 as a manual hydraulic pressure source sends out brake fluid pressurized in accordance with the amount of the operation performed on a brake pedal 24 as a brake operating member by a driver, to the disc brake units 21FR to 21RL. The power hydraulic pressure source 30 is able to send out the brake fluid as a working fluid pressurized due to the supply of power, to the disc brake units 21FR to 21RL independently of the driver's operation of the brake pedal 24. The hydraulic pressure actuator 40 appropriately adjusts the hydraulic pressure of the brake fluid supplied from the power hydraulic pressure source 30 or the master cylinder unit 27, and sends it out to the disc brake units 21FR to 21RL. Thus, the braking force on each wheel provided by the hydraulic pressure braking is adjusted.

The disc brake units 21FR to 21RL, the master cylinder unit 27, the power hydraulic pressure source 30, and the hydraulic pressure actuator 40 will be individually described in detail below. Each of the disc brake units 21FR to 21RL includes a brake disc 22, and a wheel cylinder 23FR to 23RL that is built in a brake caliper. The wheel cylinders 23FR to 23RL are respectively connected to the hydraulic pressure actuator 40 via different fluid passageways. Hereinafter, the wheel cylinders 23FR to 23RL will be collectively referred to as "wheel cylinders 23" below, where appropriate.

In each disc brake unit 21FR to 21RL, when brake fluid is supplied from the hydraulic pressure actuator 40 to the wheel cylinder 23, a brake pad as a friction member is pressed against the brake disc 22 that rotates together with a corresponding one of the wheels. Thus, braking force is applied to each wheel. Although this embodiment uses the disc brake units 21FR to 21RL, it is also permissible to use other braking force applying mechanisms which each include a wheel cylinder 23 that is, for example, a drum brake or the like.

The master cylinder unit 27 in this embodiment is a hydraulic pressure booster-equipped master cylinder, and includes a hydraulic pressure booster 31, a master cylinder 32, a regulator 33, and a reservoir 34. The hydraulic pressure booster 31 is linked to the brake pedal 24, and amplifies the pedal depressing force applied to the brake pedal 24, and transfers it to the master cylinder 32. The pedal depressing force is amplified as the brake fluid is supplied from the power hydraulic pressure source 30 to the hydraulic pressure booster 31 via the regulator 33. Then, the master cylinder 32 generates a master cylinder pressure that has a predetermined servo ratio with respect to the pedal depressing force.

The reservoir 34 that reserves brake fluid is disposed on top of the master cylinder 32 and the regulator 33. The master cylinder 32 becomes connected in communication with the reservoir 34 when the brake pedal 24 is not depressed. On the other hand, the regulator 33 is connected in communication with both the reservoir 34 and an accumulator 35 of the power hydraulic pressure source 30. Using the reservoir 34 as a low pressure source and the accumulator 35 as a high pressure source, the regulator 33 generates a hydraulic pressure substantially equal to the master cylinder pressure. The hydraulic pressure of the regulator 33 will be referred to as "regulator pressure" below, where appropriate. Incidentally, the master cylinder pressure and the regulator pressure do not need to be made strictly the same pressure. For example, it is also possible to design the master cylinder unit 27 so that the regulator pressure becomes slightly higher.

The power hydraulic pressure source 30 includes the accumulator 35 and a pump 36. The accumulator 35 converts the pressure energy of the brake fluid pressurized by the pump 36 into the pressure energy of a filler gas, such as nitrogen or the like, for example, a pressure of about 14 to 22 MPa, and stores the converted pressure. The pump 36 has a motor 36a as a drive source. A suction opening of the pump 36 is connected to the reservoir 34 while the ejection opening thereof is connected to the accumulator 35. The accumulator 35 is also connected to a relief valve 35a that is provided in the master cylinder unit 27. If the pressure of the brake fluid in the accumulator 35 abnormally rises to, for example, about 25 MPa, the relief valve 35a opens, so that the high-pressure brake fluid returns to the reservoir 34.

As described above, the brake control device 20 has the master cylinder 32, the regulator 33 and the accumulator 35 as sources of supplying the brake fluid to the wheel cylinders 23. A master piping 37 is connected to the master cylinder 32. Likewise, a regulator piping 38 is connected to the regulator 33, and an accumulator piping 39 is connected to the accumulator 35. The master piping 37, the regulator piping 38 and the accumulator piping 39 are connected to the hydraulic pressure actuator 40.

The hydraulic pressure actuator 40 includes an actuator block in which a plurality of channels are formed, and a plurality of electromagnetic control valves. The channels formed in the actuator block include individual channels 41, 42, 43 and 44, and a main channel 45. The individual channels 41 to 44 branch from the main channel 45, and are connected to the wheel cylinders 23FR, 23FL, 23RR, 23RL of the disc brake units 21FR, 21FL, 21RR, 21RL, respectively. Thus, each wheel cylinder 23 is connectable in communication with the main channel 45.

An intermediate portion of each of the individual channels 41, 42, 43 and 44 is provided with an ABS retention valve 51, 52, 53 and 54. Each of the ABS retention valves 51 to 54 has a solenoid that is on/off controlled, and a spring, and is a normally open type electromagnetic control valve that is open when the solenoid is in a non-electrified state. Each ABS retention valve 51 to 54, when in the open state, allows the brake fluid to pass in either direction. That is, the brake fluid can be caused to flow from the main channel 45 to the wheel cylinders 23, and can also be caused to flow from the wheel cylinders 23 to the main channel 45. When an ABS retention valve 51 to 54 is closed by electrifying the solenoid thereof, the passage of brake fluid in a corresponding one of the individual channels 41 to 44 is shut off.

Furthermore, the wheel cylinders 23 are connected to a reservoir channel 55 via pressure reduction-purpose channels 46, 47, 48 and 49 that are connected to the individual channels 41 to 44, respectively. An intermediate portion of each of the pressure reduction-purpose channels 46, 47, 48 and 49 is provided with an ABS pressure reducing valve 56, 57, 58 and 59. Each of the ABS pressure reducing valves 56 to 59 has a solenoid that is on/off controlled, and a spring, and is a normally closed type electromagnetic valve that is closed while the solenoid is in a non-electrified state. When an ABS pressure reducing valve 56 to 59 is in the closed state, the passage of brake fluid through a corresponding one of the pressure reduction-purpose channels 46 to 49 is shut off. When the ABS pressure reducing valve 56 to 59 is opened by electrifying the solenoid thereof, the passage of brake fluid through the corresponding one of the pressure reduction-purpose channels 46 to 49 is permitted, so that the brake fluid returns from the corresponding one of the wheel cylinders 23 to the reservoir 34 via the pressure reduction-purpose channel 46 to 49 and the reservoir channel 55. Incidentally, the reservoir channel 55 is connected to the reservoir 34 of the master cylinder unit 27 via a reservoir piping 77.

An intermediate portion of the main channel 45 has a separation valve 60. By the separation valve 60, the main channel 45 is divided to a first channel 45a connected to the individual channels 41 and 42, and a second channel 45b connected to the individual channels 43 and 44. The first channel 45a is connected to the wheel cylinders 23FR and 23FL on the front wheel side via the individual channels 41 and 42. The second channel 45b is connected to the wheel cylinders 23RR and 23RL on the rear wheel side via the individual channels 43 and 44.

The separation valve 60 has a solenoid that is on/off controlled, and a spring, and is a normally closed type electromagnetic control valve that is closed when the solenoid is in a non-electrified state. When the separation valve 60 is in the closed state, the passage of brake fluid in the main channel 45 is shut off. When the separation valve 60 is opened by electrifying the solenoid thereof, brake fluid can be passed in either direction between the first channel 45a and the second channel 45b.

In the hydraulic pressure actuator 40, a master channel 61 and a regulator channel 62 connected in communication with the main channel 45 are formed. More specifically, the master channel 61 is connected to the first channel 45a of the main channel 45, and the regulator channel 62 is connected to the second channel 45b of the main channel 45. Furthermore, the master channel 61 is connected to the master piping 37 that is connected in communication with the master cylinder 32. The regulator channel 62 is connected to the regulator piping 38 that is connected in communication with the regulator 33.

An intermediate portion of the master channel 61 has a master cut valve 64. The master cut valve 64 is provided on a supply path of brake fluid from the master cylinder 32 to the individual wheel cylinders 23. The master cut valve 64 has a solenoid that is on/off controlled, and a spring, and is a normally open type electromagnetic control valve which is guaranteed to assume a closed state due to the electromagnetic force that the solenoid generates upon being supplied with a prescribed control current, and which is open when the solenoid is in the non-electrified state. The master cut valve 64, when in the open state, allows brake fluid to pass in either direction between the master cylinder 32 and the first channel 45a of the main channel 45. When the master cut valve 64 is closed by electrifying the solenoid with a prescribed control current, the passage of brake fluid in the master channel 61 is shut off.

A stroke simulator 69 is connected to the master channel 61 at the upstream side of the master cut valve 64, via a simulator cut valve 68. That is, the simulator cut valve 68 is provided in a channel that connects the master cylinder 32 and the stroke simulator 69. The simulator cut valve 68 has a solenoid that is on/off controlled, and a spring, and is a normally closed type electromagnetic control valve which is guaranteed to assume an open valve state due to the electromagnetic force that the solenoid generates upon being supplied with a prescribed control current, and which is closed when the solenoid is in the non-electrified state. When the simulator cut valve 68 is in the closed state, the passage of brake fluid between the master channel 61 and the stroke simulator 69 is shut off. When the simulator cut valve 68 is opened by electrifying the solenoid, the brake fluid can be passed in both directions between the master cylinder 32 and the stroke simulator 69.

The stroke simulator 69 includes pistons and springs, and sends out reaction force that is in accordance with the driver's depression force on the brake pedal 24 when the simulator cut valve 68 is open. As for the stroke simulator 69, it is preferable to adopt a stroke simulator that has a multi-stepped spring characteristic in order to improve the driver's brake operation feeling.

An intermediate portion of the regulator channel 62 has a regulator cut valve 65. The regulator cut valve 65 is provided on a supply path of brake fluid from the regulator 33 to the individual wheel cylinders 23. The regulator cut valve 65 also has a solenoid that is on/off controlled, and a spring, and is a normally open type electromagnetic control valve which is guaranteed to assume a closed state due to the electromagnetic force that the solenoid generates upon being supplied with a prescribed control current, and which is open when the solenoid is in the non-electrified state. The regulator cut valve 65, when in the open state, allows brake fluid to pass in either direction between the regulator 33 and the second channel 45b of the main channel 45. When the regulator cut valve 65 is closed by electrifying the solenoid, the passage of brake fluid in the regulator channel 62 is shut off.

In the hydraulic pressure actuator 40, an accumulator channel 63 is also formed in addition to the master channel 61 and the regulator channel 62. An end of the accumulator channel 63 is connected to the second channel 45b of the main channel 45, and another end thereof is connected to the accumulator piping 39 that is connected in communication with the accumulator 35.

An intermediate portion of the accumulator channel 63 has a pressure-increasing linear control valve 66. Furthermore, the accumulator channel 63, and the second channel 45b of the main channel 45 are connected to the reservoir channel 55 via a pressure-reducing linear control valve 67. Each of the pressure-increasing linear control valve 66 and the pressure-reducing linear control valve 67 has a linear solenoid, and a spring, and is a normally closed type electromagnetic control valve that is closed when the solenoid thereof is in the non-electrified state. In each of the pressure-increasing linear control valve 66 and the pressure-reducing linear control valve 67, the valve opening degree is adjusted in proportion to the electric current supplied to the solenoid thereof.

The pressure-increasing linear control valve 66 is provided as a common pressure-increasing control valve for shared use for the plurality of wheel cylinders 23 that are provided corresponding to the wheels. Likewise, the pressure-reducing linear control valve 67 is provided as a common pressure reducing control valve for the wheel cylinders 23. That is, in this embodiment, the pressure-increasing linear control valve 66 and the pressure-reducing linear control valve 67 are provided as a pair of common control valves for the wheel cylinders 23 which control the supply and discharge of the working fluid sent out from the power hydraulic pressure source 30, with respect to the wheel cylinders 23. In the light of cost, the provision of the pressure-increasing linear control valve 66 and the like for shared use for the wheel cylinders 23 as described above is more preferable than a construction in which linear control valves are provided individually for the wheel cylinder 23.

Incidentally, the differential pressure between the outlet and inlet openings of the pressure-increasing linear control valve 66 corresponds to the pressure difference between the pressure of brake fluid in the accumulator 35 and the pressure of brake fluid in the main channel 45. The differential pressure between the outlet and inlet openings of the pressure-reducing linear control valve 67 corresponds to the pressure difference between the pressure of brake fluid in the main channel 45 and the pressure of brake fluid in the reservoir 34. Furthermore, a relationship of F1+F3=F2 holds where F1 is the electromagnetic drive force that is in accordance with the electric power supplied to the linear solenoid of the pressure-increasing linear control valve 66 or the pressure-reducing linear control valve 67, F2 is the elastic force of the spring thereof, and F3 is a differential pressure action force that is in accordance with the differential pressure between the outlet and inlet openings of the pressure-increasing linear control valve 66 or the pressure-reducing linear control valve 67. Therefore, by continuously controlling the electric powers supplied to the linear solenoids of the pressure-increasing linear control valve 66 and the pressure-reducing linear control valve 67, the differential pressures between the outlet and inlet openings of the pressure-increasing linear control valve 66 and the pressure-reducing linear control valve 67 can be controlled.

In the brake control device 20, the power hydraulic pressure source 30 and the hydraulic pressure actuator 40 are controlled by a brake ECU 70 that is provided as a controller in this embodiment. The brake ECU 70 is constructed as a microprocessor that includes a CPU. Besides the CPU, the brake ECU 70 further includes a ROM that stores various programs, a RAM for temporarily storing data, input/output ports, communication ports, etc. The brake ECU 70 is capable of communicating with a hybrid ECU (not shown) that is superior thereto, and the like. On the basis of control signals from the hybrid ECU and signals from various sensors, the brake ECU 70 controls the pump 36 of the power hydraulic pressure source 30, and the electromagnetic control valves 51 to 54, 56 to 59, 60, 64 to 68 that constitute the hydraulic pressure actuator 40.

A regulator pressure sensor 71, an accumulator pressure sensor 72 and a control pressure sensor 73 are connected to the brake ECU 70. The regulator pressure sensor 71 detects the pressure of brake fluid in the regulator channel 62 on the upstream side of the regulator cut valve 65, that is, the regulator pressure, and gives a signal indicating the detected value, to the brake ECU 70. The accumulator pressure sensor 72 detects the pressure of brake fluid in the accumulator channel 63 on the upstream side of the pressure-increasing linear control valve 66, that is, the accumulator pressure, and gives a signal indicating the detected value, to the brake ECU 70. The control pressure sensor 73 detects the pressure of brake fluid in the first channel 45a of the main channel 45, and gives a signal indicating the detected value, to the brake ECU 70. The detected values of the pressure sensors 71 to 73 are sequentially applied to the brake ECU 70 at predetermined time intervals, and are stored and retained in predetermined storage areas in the brake ECU 70, in a predetermined amount at a time.

In the case where the separation valve 60 is open and the first channel 45a and the second channel 45b of the main channel 45 are connected in communication with each other, the output value of the control pressure sensor 73 indicates the hydraulic pressure on the low-pressure side of the pressure-increasing linear control valve 66, and also indicates the hydraulic pressure on the high-pressure side of the pressure-reducing linear control valve 67. Therefore, the output value thereof can be used for the control of the pressure-increasing linear control valve 66 and the pressure-reducing linear control valve 67. In the case where the pressure-increasing linear control valve 66 and the pressure-reducing linear control valve 67 are closed and where the master cut valve 64 is in the open state, the output value of the control pressure sensor 73 indicates the master cylinder pressure. Furthermore, in the case where the separation valve 60 is open so that the first channel 45a and the second channel 45b of the main channel 45 are connected in communication with each other and where the ABS retention valves 51 to 54 are open while the ABS pressure reducing valves 56 to 59 are closed, the output value of the control pressure sensor 73 indicates the working fluid pressure that acts on each wheel cylinder 23, that is, the wheel cylinder pressure.

Furthermore, the sensors connected to the brake ECU 70 also include a stroke sensor 25 that is provided for the brake pedal 24. The stroke sensor 25 detects the pedal stroke as the amount of operation of the brake pedal 24, and gives a signal indicating the detected value, to the brake ECU 70. The output value of the stroke sensor 25 is also sequentially applied to the brake ECU 70 at predetermined time intervals, and is stored and retained in a predetermined area in the brake ECU 70 in a predetermined amount at a time. Brake operation state detectors other than the stroke sensor 25 may also be provided and connected to the brake ECU 70, in addition to the stroke sensor 25 or in place of the stroke sensor 25. Examples of the brake operation state detectors include a pedal depression force sensor that detects the operation force on the brake pedal 24, a brake switch that detects that the brake pedal 24 has been depressed, etc.

The brake control device 20 constructed as described above is able to execute the brake regeneration coordinated control. Upon receiving a braking request, the brake control device 20 starts braking. The braking request is generated when braking force needs to be applied to the vehicle, for example, when a driver operates the brake pedal 24.

Receiving the braking request, the brake ECU 70 calculates a requested braking force, and then calculates a requested hydraulic pressure braking force that is a braking force to be generated by the brake control device 20, by subtracting the braking force produced by the regeneration, from the requested braking force. The value of the braking force produced by the regeneration is supplied from the hybrid ECU to the brake control device 20. Then, on the basis of the requested hydraulic pressure braking force calculated as described above, the brake ECU 70 calculates a target hydraulic pressure for the wheel cylinders 23FR to 23RL. The brake ECU 70 determines the value of the control current to be supplied to the pressure-increasing linear control valve 66 and pressure-reducing linear control valve 67 in accordance with a feedback control law so that the wheel cylinder pressure becomes equal to the target hydraulic pressure.

As a result, in the brake control device 20, brake fluid is supplied from the power hydraulic pressure source 30 to the individual wheel cylinders 23 via the pressure-increasing linear control valve 66, so that braking force is applied to the wheels. Brake fluid is discharged from the wheel cylinders 23 via the pressure-reducing linear control valve 67 in accordance with need so as to adjust the braking force applied to the wheels. In this embodiment, the power hydraulic pressure source 30, the pressure-increasing linear control valve 66, the pressure-reducing linear control valve 67, etc., constitute a wheel cylinder pressure control system. By the wheel cylinder pressure control system, a so-called brake-by-wire braking force control is performed. The wheel cylinder pressure control system is provided in parallel with the supply path of brake fluid from the master cylinder unit 27 to the wheel cylinders 23.

At this time, the brake ECU 70 causes the regulator cut valve 65 to be in the closed state, so that the brake fluid sent out from the regulator 33 is not supplied to the main channel 45. Furthermore, the brake ECU 70 causes the master cut valve 64 to be in the closed state, and the simulator cut valve 68 to be in the open state. This operation is performed in order that the brake fluid sent out from the master cylinder 32 in association with the operation of the brake pedal 24 performed by the driver will be supplied to the stroke simulator 69, not to the wheel cylinders 23. During the brake regeneration coordinated control, a differential pressure corresponding in magnitude to the regenerative braking force acts between the upstream and downstream sides of the regulator cut valve 65 and between the upstream and downstream sides of the master cut valve 64.

In the brake control device 20 in accordance with this embodiment, it should be obvious that the braking force can also be controlled by the wheel cylinder pressure control system even when the regenerative braking force is not utilized but the hydraulic braking force alone is used to realize the requested braking force. The control mode in which the braking force is controlled by the wheel cylinder pressure control system will hereinafter be termed "linear control mode" as appropriate, regardless of whether or not the brake regeneration coordinated control is executed during the control mode. This control mode will sometimes be also referred to as "the brake-by-wire control".

For example, the so-called VSC (Vehicle Stability Control), the TRC (Traction Control), etc. for stabilizing the behavior of the vehicle by restraining the slip of each wheel with respect to the road surface, are executed in the linear control mode. The VSC control is a control for restraining skid or sideslip of the wheels during the turning of the vehicle. The TRC control is a control for restraining the spinning of the drive wheels during takeoff or acceleration of the vehicle. Besides, a brake assistance control that heightens the braking force by supplementing the braking force input by the driver at the time of emergency braking can be executed in the linear control mode.

During the control in the linear control mode, the wheel cylinder pressure sometimes deviates from the target hydraulic pressure due to occurrence of an abnormality, for example, a failure or the like. The brake ECU 70 periodically determines the presence/absence of a response abnormality regarding the wheel cylinder pressure, for example, on the basis of a value measured by the control pressure sensor 73. When it is determined that there is an abnormality in the control response of the wheel cylinder pressure, the brake ECU 70 discontinues the linear control mode, and switches the control mode to the manual brake mode. In the manual brake mode, the force input to the brake pedal 24 by the driver is converted into a hydraulic pressure, and is mechanically transferred to the wheel cylinders 23, so that braking force is given to the wheels. From a viewpoint of fail-safe operation, the manual brake mode also serves as a backup control mode for the linear control mode.

The brake ECU 70 can select a mode from a plurality of modes as a manual brake mode by varying the brake fluid supply path from the hydraulic pressure source to the wheel cylinders 23. In this embodiment, the shift to a non-control mode, as an example, will be described. During the non-control mode, the brake ECU 70 stops the supply of control current to all the electromagnetic control valves. Therefore, the master cut valve 64 and the regulator cut valve 65, which are of the normally open type, are opened, and the separation valve 60 and the simulator cut valve 68, which are of the normally closed type, are closed. The pressure-increasing linear control valve 66 and the pressure-reducing linear control valve 67 stop being controlled, and are closed.

In consequence, the supply path of brake fluid is separated into two systems, that is, the master cylinder side, and the regulator side. The master cylinder pressure is transferred to the front wheel-side wheel cylinders 23FR, 23FL, and the regulator pressure is transferred to the rear wheel-side wheel cylinders 23RR, 23RL. The destination element to which working fluid is sent out is switched from the stroke simulator 69 to the front wheel-side wheel cylinders 23FR, 23FL (which means that the switching is performed so that the output of working fluid to the stroke simulator 69 is shut off, and working fluid is output to the wheel cylinders 23FR, 23FL for the front wheels). According to the non-control mode, braking force can be generated even when the electrification of an electromagnetic control valve does not occur due to an abnormality in the control system, which is preferable from a viewpoint of fail-safe operation. In this embodiment, the supply path at the regulator 33-side supply path corresponds to a first supply path, and the master cylinder 32-side supply path corresponds to a second supply path.

However, if the differential pressure between the outlet and inlet openings of the on-off valve, in particular, the regulator cut valve 65, is above a predetermined pressure at the time of shift to the backup brake mode, there is a possibility that the effect of the differential pressure will maintain the closed state of the on-off valve despite the valve opening command and thus high pressure will be confined in the wheel cylinders 23 downstream of the on-off valve. This predetermined pressure will be hereinafter termed the self-closure-release pressure as appropriate. When the confinement of the wheel cylinder pressure occurs, the corresponding wheels are caused to have drags following braking.

In a normally open type electromagnetic control valve such as the regulator cut valve 65, if during the on-state, that is, the closed state, a hydraulic pressure above the self-closure-release pressure is acting between the outlet and inlet openings in such a direction as to close the control valve, the control valve cannot return to the open state when the electrification is stopped in accordance with the valve opening command. This is because the self-closure-release pressure is the maximum value of the differential pressure between the outlet and inlet openings of the control valve which allows the control valve to be returned to the open state by the valve opening force of the return spring of the control valve. Incidentally, in the foregoing embodiment, the regulator cut valve 65 is mounted so that the differential pressure between the outlet and inlet openings of the control valve acts in such a direction as to close the valve when the pressure in the wheel cylinders 23, which are on the downstream side, is higher than the pressure in the regulator 33, which is at the upstream side.

Hereinafter, this direction will sometimes be termed "self closure direction" as appropriate.

In particular, in the case where the separation valve 60 has a closure failure, the wheel cylinder pressure control system connected to the regulator 33 side and the control pressure sensor 73 disposed on the master cylinder 32 side are separated from each other. The control pressure sensor 73 is a pressure sensor that can be used for measuring the wheel cylinder pressure, and in this embodiment, is not provided on the regulator 33 side but is provided only on the master cylinder 32 side. As a result of the separation, the supply of brake fluid to the master cylinder 32 side is shut off, and the measurement value of the control pressure sensor 73 deviates from the target hydraulic pressure. Until the aforementioned abnormality is detected, the brake ECU 70 controls the pressure-increasing linear control valve 66 so that the measurement value of the control pressure sensor 73 follows the target hydraulic pressure.

Therefore, if the closure failure occurs on the separation valve 60, there is possibility that, as the pressure-increasing linear control valve 66 is controlled so as to cause the measurement value of the control pressure sensor 73 to follow the target hydraulic pressure, the pressure in the rear wheel-purpose wheel cylinders 23RR, 23RL on the regulator 33 side will be excessively increased to, for example, the accumulator pressure. As a result, there is a possibility that the differential pressure that acts on the regulator cut valve 65 will exceed the self-closure-release pressure, and that the confinement of hydraulic pressure in the rear wheel-purpose wheel cylinders 23RR, 23RL at the downstream side of the regulator cut valve 65 will occur when the mode shifts to the non-control mode.

In this embodiment, the self-closure-release pressure of the regulator cut valve 65 is set relatively low and, in particular, lower than the maximum value of the wheel cylinder pressure that is realized by the wheel cylinder pressure control system, and therefore there is a tendency to more likely occurrence of the confinement of hydraulic pressure. The maximum value of the wheel cylinder pressure that is possible (hereinafter, referred to as "maximum wheel cylinder pressure", as appropriate) is, for example, the maximum hydraulic pressure that is storable as the accumulator pressure. In addition to the case of the closure failure of the separation valve 60, the case of, for example, an open failure of the pressure-increasing linear control valve 66 or a failure of the control pressure sensor 73 can sometimes result in the wheel cylinder pressure reaching its maximum. Thus, in this embodiment, the differential pressure acting between the outlet and inlet openings of the regulator cut valve 65 in the self closure direction can sometimes exceed the self-closure-release pressure. Incidentally, the open failure herein means an abnormal state in which the valve cannot be closed but remains in the open state when the valve is to be closed, while the closure failure means an abnormal state in which the valve cannot be opened but remains in the closed state when the valve needs to be opened.

The self-closure-release pressure of the regulator cut valve 65 is set relatively low mainly for the following two reasons. One reason is that the setting of the self-closure-release pressure at a low value can realize a size reduction of the regulator cut valve 65 and therefore a size reduction of the brake control device 20. The other reason is that the setting of the self-closure-release pressure at a low value can sufficiently secure a good performance in introducing hydraulic pressure from the regulator 33. The performance in introducing hydraulic pressure from the regulator 33 to the wheel cylinder 23 can be improved merely by increasing the hole size in the valve structure of the regulator cut valve 65. This, however, reduces the self-closure-release pressure. Incidentally, the securement of good performance in introducing hydraulic pressure from the regulator 33 is taken into consideration, for the purpose of, for example, heightening the braking performance by using the hydraulic pressure introduced from the regulator 33 as an assistance to the wheel cylinder pressure control system at the time of sudden braking or the like.

In this embodiment, when the occurrence of the closure failure on the separation valve 60 is assumed during braking, the brake ECU 70 discontinues the control performed by the wheel cylinder pressure control system, and shifts to the backup brake mode. At this time, the brake ECU 70 controls the discharge of working fluid from the regulator 33-side rear wheel-purpose wheel cylinders 23RR, 23RL so as to lessen the differential pressure so that the on-off valve, in particular, the regulator cut valve 65, is opened in accordance with the valve opening command. The brake ECU 70, at the time of end of the braking following the shift to the backup brake mode, controls the pressure-reducing linear control valve 67 so as to reduce the regulator 33-side wheel cylinder pressures.

With reference to FIG. 2, a pressure reducing process for the wheel cylinder pressure in accordance with the embodiment of the invention will be further described in detail. FIG. 2 is a flowchart for describing an example of the pressure reducing process for the wheel cylinder pressure in accordance with the embodiment of the invention. The process shown in FIG. 3 is executed by the brake ECU 70 when the mode is shifted to the aforementioned non-control mode in the case where the closure failure of the separation valve 60 is assumed. An example of the case where the closure failure of the separation valve 60 is assumed is the case where a response delay abnormality is detected in the wheel cylinder pressure. The brake ECU 70 determines that the response delay abnormality has occurred, if a state in which the hydraulic pressure measured by the control pressure sensor 73 is lower than the target hydraulic pressure by at least a predetermined pressure continues for more than a predetermined criterion time.

When the process shown in FIG. 2 starts, the brake ECU 70 firstly shifts the control mode from the linear control mode to the non-control mode (S10). As a precondition for starting this process, the response delay abnormality exists in the wheel cylinder pressure. At this time, concretely, the brake ECU 70 opens the master cut valve 64 and the regulator cut valve 65 and closes the separation valve 60, the pressure-increasing linear control valve 66 and the pressure-reducing linear control valve 67 by stopping the electrification of the control valves. In this embodiment, the brake ECU 70 stopping the electrification of the regulator cut valve 65 corresponds to a valve opening command to the regulator cut valve 65.

Subsequently, the brake ECU 70 determines whether or not the driver's braking request is off, that is, whether or not the driver is depressing the brake pedal 24 (S12). While the braking request continues to be on (NO in S12), the brake ECU 70 does not proceed to the next process, but wait. The presence/absence of depression of the brake pedal 24 can be determined, for example, from the output of the stroke sensor 25 or of a stop lamp switch.

If it is determined that the braking request is off (YES in S12), the brake ECU 70 executes the pressure reducing control via the pressure-reducing linear control valve 67 (S14). The brake ECU 70 executes the pressure reducing control by appropriately controlling the pressure-reducing linear control valve 67 to an open state for a predetermined set time. The set time herein is, for example, set at an amount of time that is considered to be needed in order to reduce the differential pressure acting between the outlet and inlet openings of the regulator cut valve 65 to or below the self-closure-release pressure of the valve when the wheel cylinder pressure is equal to the maximum value of the assumable wheel cylinder pressure, for example, the maximum value of the accumulator pressure. This set time is appropriately set beforehand through experiments or the like, and is stored in the brake ECU 70. After executing the pressure reducing control, the brake ECU 70 ends the process.

According to the embodiment, when the differential pressure acting on the regulator cut valve 65 becomes smaller than the self-closure-release pressure due to the pressure reducing control, the regulator cut valve 65 naturally opens. When the regulator cut valve 65 is open, the surplus hydraulic pressure of the wheel cylinder pressure can be drained to the regulator 33 via the regulator cut valve 65. Therefore, the confinement of the wheel cylinder pressure is prevented, and the drag of wheels that can result from the pressure confinement is also prevented. Although in the foregoing embodiment, the pressure reducing control is executed via the pressure-reducing linear control valve 67, it is also possible to use, for example, the ABS pressure-reducing valves 58, 59.

Besides, according to the embodiment, after the braking request is determined as being off, the wheel cylinder pressure is reduced. Therefore, this embodiment is also preferable in that it is possible to prevent decline in the vehicle deceleration, that is, so-called deceleration declination phenomenon, during the process of shifting to the non-control mode while braking is being performed.

In this embodiment, when the response delay abnormality occurs, the pressure reducing control is executed. However, the pressure reducing control may be executed, not only in the case of the response delay abnormality, but also in the case where a state in which the deviation of the hydraulic pressure measured by the control pressure sensor 73 from the target hydraulic pressure is greater than a reference deviation continues for more than a predetermined criterion time. This is because, for example, in the case where the open failure occurs on the pressure-increasing linear control valve 66, it is conceivable that the hydraulic pressure measured by the control pressure sensor 73 sharply increases, and deviates considerably above the target hydraulic pressure. In such a case, too, it is preferable to avoid the confinement of the wheel cylinder pressure by performing the pressure reducing control in accordance with the embodiment.

Next, a modification of the foregoing embodiment will be described with reference to FIG. 3. In the case where the response delay abnormality occurs, the closure failure of the separation valve 60 is assumed to be a possible cause, but actually other factors are also conceivable. For example, the control pressure sensor 73 having an abnormality is conceivable as a factor, or the pressure-increasing linear control valve 66 having a closure failure is also conceivable as a factor. If the closure failure of the pressure-increasing linear control valve 66 is the case, the occurrence of the confinement of the wheel cylinder pressure is unlikely in the first place, and therefore the need to execute the foregoing pressure reducing control is low. Therefore, in this modification, it is specifically determined whether or not the cause of occurrence of the response delay abnormality is the closure failure of the separation valve 60. Then, if the closure failure of the separation valve 60 is confirmed, the pressure reducing control is executed. In this manner, the pressure reducing control can be executed exclusively when the need for the pressure-reducing process is high.

FIG. 3 is a flowchart for describing an example of the process of identifying the closure failure of the separation valve 60 in accordance with a modification of the embodiment. In the process shown in FIG. 3, the brake ECU 70 firstly determines whether or not there is a response delay abnormality (S100). If there is not a response delay abnormality (NO in S100), the process in accordance with the embodiment is not needed, and the brake ECU 70 ends the process.

If there is a response delay abnormality (YES in S100), the brake ECU 70 causes the control pressure sensor 73 to perform self-diagnosis, and determines whether or not the control pressure sensor 73 has an abnormality such as a broken wire or the like (S102). In the embodiment, the control pressure sensor 73 is equipped with a self-diagnostic function, and is capable of diagnosing whether or not the sensor has an abnormality, such as a broken wire or the like. Therefore, it can be distinguished whether the determination of the presence of the response delay abnormality is caused by an abnormality occurring on the control pressure sensor 73, or the determination of the presence of the response delay abnormality is caused by actual occurrence of the response delay abnormality due to an abnormality of a control valve or the like.

If the result of the self-diagnosis of the control pressure sensor 73 shows the occurrence of the abnormality (YES in S102), the brake ECU 70 determines that the control pressure sensor 73 has an abnormality (S104), and continues to execute the process shown in FIG. 2. That is, the brake ECU 70 shifts to the non-control mode, and then executes the pressure reducing control after the braking becomes off. If the result of the self-diagnosis of the control pressure sensor 73 does not show the occurrence of the abnormality (NO in S102), the brake ECU 70 causes the control current supplied to the pressure-increasing linear control valve 66 to be equal to the maximum value (S 106). When the supply current to the pressure-increasing linear control valve 66 is maximized, the degree of opening of the pressure-increasing linear control valve 66 becomes maximum if the pressure-increasing linear control valve 66 is normally functioning. In that case, therefore, the value measured by the accumulator pressure sensor 72 provided upstream of the pressure-increasing linear control valve 66 declines.

After the supply current to the pressure-increasing linear control valve 66 is maximized, the brake ECU 70 determines whether or not there is a change in the value measured by the accumulator pressure sensor 72 (S108). If it is determined that there is not a change in the value measured by the accumulator pressure sensor 72 (NO in S108), the brake ECU 70 determines that the pressure-increasing linear control valve 66 has the closure failure (S112). This is explained as follows. That is, if although the supply current to the pressure-increasing linear control valve 66 is maximized, the value measured by the accumulator pressure sensor 72 does not exhibit a change, then the pressure-increasing linear control valve 66 is considered to be in the closed state. In this case, since it is considered that the confinement of the wheel cylinder pressure will not occur, the brake ECU 70 does not execute the foregoing pressure reducing control although the ECU 70 shifts to the non-control mode. Incidentally, if there is no change in the value measured by the accumulator pressure sensor 72, it may be determined whether the accumulator pressure sensor 72 has an abnormality via the self-diagnostic function of the accumulator pressure sensor 72.

If it is determined that there is a change in the value measured by the accumulator pressure sensor 72 (YES in S108), the brake ECU 70 determines that the separation valve 60 has the closure failure (S110). This case is the case where although the supply of brake fluid via the pressure-increasing linear control valve 66 is normally performed and the control pressure sensor 73 has no abnormality, there is no change in the value measured by the control pressure sensor 73. The cause of this is considered to be the closure failure occurring on the separation valve 60 provided between the pressure-increasing linear control valve 66 and the control pressure sensor 73. If it is determined that the separation valve 60 has the closure failure, the brake ECU 70 continues to execute the process shown in FIG. 2. Specifically, the brake ECU 70 shifts to the non-control mode, and then executes the pressure reducing control after the braking becomes off.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A brake control device comprising:
   a plurality of wheel cylinders that are supplied with a working fluid and applies a braking force to each of a plurality of wheels;
   a manual hydraulic pressure source that pressurizes the working fluid held in the manual hydraulic pressure source, in accordance with an amount of operation performed on a brake operating member by a driver;
   a separation valve that is caused to be in a closed state at a time of a backup brake mode during which the working fluid is supplied from the manual hydraulic pressure source to the plurality of wheel cylinders, so that the separation valve separates a first supply path that supplies the working fluid to at least one of the plurality of wheel cylinders and a second supply path that supplies the working fluid to at least one of the plurality of wheel cylinders other than the at least one of the plurality of wheel cylinders supplied with the working fluid by the first supply path, from each other;
   a wheel cylinder pressure control system that is connected to the first supply path, and that controls the working fluid pressure of the plurality of wheel cylinders in a manner common to the plurality of wheel cylinders, independently of brake operation of the driver;
   an on-off valve that is provided on the first supply path, and that is kept in a closed valve state despite a valve opening command, due to an effect of a differential pressure between an outlet opening and an inlet opening of the on-off valve if the differential pressure is above a predetermined pressure while the on-off valve is closed;
   a master cut valve that is provided on the second supply path, and allows the working fluid to pass in either direction between the manual hydraulic pressure source and the second supply path in an open valve state;
   a pressure sensor that is disposed on the second supply path, and that measures a wheel cylinder pressure common to the first supply path and the second supply path if the separation valve is in an open state, and that measures the pressure of the wheel cylinders on a side of the second supply path if the separation valve is in the closed state;
   a pressure-reducing valve that is connected to the first supply path and that reduces the pressure of the wheel cylinders on a side of the first supply path;
   a pressure-increasing valve that is connected to the first supply path and that increases the pressure of the wheel cylinders on the side of the first supply path; and
   a controller that determines occurrence of a closure failure on the separation valve is assumed when the pressure measured by the pressure sensor is lower than a target hydraulic pressure by at least a predetermined pressure for more than a predetermined period of time when the master cut valve and the on-off valve are open, and the separation valve, the pressure-reducing valve, and the pressure-increasing value are closed, and that, when occurrence of a closure failure on the separation valve is assumed during braking, stops a control performed by the wheel cylinder pressure control system, and shifts to the backup brake mode, and controls discharge of the working fluid from the wheel cylinders on the first supply path side with the use of the pressure-reducing valve so as to lessen the differential pressure so that the on-off valve is opened in accordance with the valve opening command.

2. The brake control device according to claim 1, wherein the controller reduces the pressure of the wheel cylinders on the first supply path side at a time of end of braking following a shift to the backup brake mode.

3. The brake control device according to claim 1, wherein the pressure-reducing valve is provided on a channel that connects the wheel cylinders on the first supply path side and a reservoir that reserves the working fluid, and
   wherein the controller reduces a wheel cylinder pressure of the first supply path side by controlling the pressure-reducing valve.

4. The brake control device according to claim 1, wherein the controller reduces a wheel cylinder pressure of the first supply path side by opening the pressure-reducing valve for a predetermined amount of time.

5. The brake control device according to claim 1,
   wherein the controller controls the wheel cylinder pressure so that a value measured by the pressure sensor equals a target pressure during the control performed by the wheel cylinder pressure control system.

6. The brake control device according to claim 1, wherein the predetermined pressure of the on-off valve is set smaller than a maximum value of wheel cylinder pressure of the wheel cylinder pressure control system.

7. The brake control device according to claim 1, wherein the manual hydraulic pressure source includes a regulator and a master cylinder, and
   wherein a first channel connects the regulator to the first supply path, and a second channel connects the master cylinder to the second supply path.

8. The brake control device according to claim 7, wherein the on-off valve allows the working fluid to pass between the regulator and the first supply path in an open state, and shuts off passage of the working fluid in the first channel in a closed state.

9. The brake control device according to claim 1, further comprising a power hydraulic pressure source connected to the pressure-increasing valve, the power hydraulic pressure source including a pump and an accumulator which converts pressure energy of the working fluid pressurized by the pump into pressure energy of a filler gas.

* * * * *